(12) United States Patent
Liu et al.

(10) Patent No.: US 9,109,822 B2
(45) Date of Patent: Aug. 18, 2015

(54) EXPANSION VALVE

(75) Inventors: Changqing Liu, Zhejiang (CN); Hongmin Song, Zhejiang (CN); Jie Liu, Zhejiang (CN); Boting Chen, Zhejiang (CN)

(73) Assignee: Zhejiang Sanhua Co., Ltd., Zheijiang (CN)

( * ) Notice: Subject to any disclaimer, the term of this patent is extended or adjusted under 35 U.S.C. 154(b) by 84 days.

(21) Appl. No.: 13/509,771

(22) PCT Filed: Jun. 20, 2011

(86) PCT No.: PCT/CN2011/075928
§ 371 (c)(1),
(2), (4) Date: May 14, 2012

(87) PCT Pub. No.: WO2012/065437
PCT Pub. Date: May 24, 2012

(65) Prior Publication Data
US 2013/0227980 A1    Sep. 5, 2013

(30) Foreign Application Priority Data
Nov. 18, 2010   (CN) .......................... 2010 1 0551254

(51) Int. Cl.
F25B 41/06    (2006.01)
F25B 41/04    (2006.01)
F16K 31/122   (2006.01)

(52) U.S. Cl.
CPC ........... *F25B 41/043* (2013.01); *F16K 31/1221* (2013.01); *F25B 41/062* (2013.01); *F25B 2341/064* (2013.01); *F25B 2341/068* (2013.01)

(58) Field of Classification Search
CPC ............. F25B 41/062; F25B 2341/064; F25B 2341/068; F25B 41/043; F25B 2341/06; F16K 31/1221

USPC .................................. 62/222, 225; 236/92 B
See application file for complete search history.

(56) References Cited

U.S. PATENT DOCUMENTS 3,967,782 A * 7/1976 Eschbaugh et al. ......... 236/92 B
4,750,334 A * 6/1988 Leimbach ...................... 62/225
(Continued)

FOREIGN PATENT DOCUMENTS

CN    1786625 A    6/2006
CN    1804440 A    7/2006
(Continued)

OTHER PUBLICATIONS

European Patent Office, Extended European Search Report, Application No. EP 11824294, Mar. 18, 2013.
International Search Report and Written Opinion under date of mailing of Oct. 13, 2011 in connection with PCT/CN2011/075928.

*Primary Examiner* — M. Alexandra Elve
*Assistant Examiner* — Henry Crenshaw
(74) *Attorney, Agent, or Firm* — Quarles & Brady LLP

(57) ABSTRACT

An expansion valve is disclosed herein and includes a valve body having a chamber; a valve seat and a valve core are provided in the chamber; a first opening and a second opening in communication with the chamber, wherein the valve core moves relative to the valve seat to control a size of a flow channel between the first opening and the second opening, wherein the valve core includes a valve core head portion facing the valve seat, the valve head portion is provided with an axial through hole, a piston is provided in the axial through hole, the piston is connected with the valve body. The piston which is connected with the valve body is provided in the axial through hole of the valve core head portion of the expansion valve. Therefore, fluid pressure may be transmitted to the valve body by the piston, so as to reduce the forces applied on the valve core, and balance the influence of differential pressure between high pressure and low pressure on the valve core more steadily, which in turn can reflect the change in the superheat degree at the outlet of the evaporator truly.

11 Claims, 7 Drawing Sheets

(56) References Cited

U.S. PATENT DOCUMENTS

| | | | |
|---|---|---|---|
| 6,116,574 A * | 9/2000 | Petersen | 251/282 |
| 6,510,701 B2 * | 1/2003 | Kato et al. | 62/225 |
| 6,560,982 B2 * | 5/2003 | Kobayashi et al. | 62/225 |
| 6,561,433 B2 | 5/2003 | Sudo et al. | |
| 6,868,684 B2 * | 3/2005 | Law et al. | 62/225 |
| 7,624,930 B2 * | 12/2009 | Honda et al. | 236/92 B |
| 2004/0020996 A1 * | 2/2004 | Kobayashi et al. | 236/92 B |
| 2006/0117793 A1 | 6/2006 | Tsugawa et al. | |

FOREIGN PATENT DOCUMENTS

| | | | |
|---|---|---|---|
| CN | 2804508 Y | 8/2008 | |
| CN | 101245860 A | 8/2008 | |
| FR | 2782547 A1 | 2/2000 | |
| JP | 55155976 A * | 12/1980 | F16K 17/38 |
| JP | 2006300442 A | 11/2006 | |

* cited by examiner

EXPANSION VALVE

CROSS-REFERENCE TO RELATED APPLICATIONS

This application claims priority to PCT International Application No. PCT/CN2011/075928 filed on Jun. 20, 2011, which claims priority to Chinese Patent Application No. 201010551254.4, on Nov. 18, 2010, both of which are fully incorporated by reference herein.

FIELD OF THE INVENTION

The present invention relates to refrigeration technology area, especially to an expansion valve.

BACKGROUND OF THE INVENTION

An expansion valve is usually arranged in a circuit of a refrigeration cycle system. The expansion valve controls the opening of the valve by sensing the superheat degree at an outlet of an evaporator or a suction section of a compressor in the refrigeration system, so as to realize the flow regulation as well as throttling and pressure reduction of the refrigerant in the system.

Please refer to FIG. 1, in which the structural schematic view of a typical expansion valve is shown.

Usually, the expansion valve is provided with an inlet pipe 900 and an outlet pipe 400. High-pressure fluid from a condenser enters from the inlet pipe 900, and flows towards the evaporator from the outlet pipe 400 after having been throttled and reduced in pressure. The upper end of the expansion valve includes air tank head 100 and driving rod 200, the driving rod 200 is connected with a valve core 500. A valve seat 1000 is provided at the joining position of outlet pipe 400 and the inlet pipe 900. The valve core 500 fits with the valve seat 1000 and abuts a supporting component 700 via a spring 600.

The bottom portion of the supporting component 700 is connected with an adjusting rod 800. The valve core 500, the supporting component 700 and the spring 600 are disposed in valve housing. The adjusting rod 800 is fixed to an adjusting seat.

A temperature sensing bulb is arranged at the outlet of the evaporator, which senses the temperature at the outlet of the evaporator. When the temperature is too high, the pressure of the working medium in the temperature sensing bulb is increased and transferred through capillary tube to the diaphragm in the air tank head. In this way, the diaphragm is moved downwards, and the driving rod 200 is driven to push the valve core 500 away from the valve seat 1000, such that the valve core 500 is able to control the size of the connecting opening between the inlet pipe 900 and outlet pipe 400 by the pressure generated from the temperature sensing bulb.

Furthermore, high-pressure condensation pressure from the inlet pipe 900 applies a force in a direction of opening the valve to the valve core 500, and the evaporation pressure from the outlet pipe 400 applies a force in a direction of closing the valve to the valve core 500. Therefore, besides the pressure from the temperature sensing bulb which opens the valve core 500 as well as the evaporation pressure and the spring force which close the valve core 500, the valve core 500 will additionally bear the force resulted form the differential pressure between high pressure and low pressure. As for the valve with small capacity or low-pressure refrigeration system, the force which is applied to the valve core 500 and resulted from the differential pressure between high pressure and low pressure imposes little influence on the system, however, as for the valve with large capacity or high-pressure refrigeration system, the force which is applied to the valve core 500 and resulted from the differential pressure between high pressure and low pressure will impose significant influence on the system. In this case, the superheat degree of the expansion valve is unable to reflect the true superheat degree of the evaporator, and the working efficiency of the system is greatly reduced. Furthermore, if the expansion valve having such structure is applied to the system such as heat pump which requires bidirectional operation, the force which is applied to the valve core 500 and resulted from the differential pressure between high pressure and low pressure when the system is operated in the refrigerating mode is just opposite to that when the system is operated in a heating mode, which makes it impossible to keep the static superheat degree identical in the two directions, such that the working efficiency reduction in one cycle of refrigerating mode or heating mode will become more significant.

In order to solve the above problems, some improvements are made to the structure of the valve core 500 in the prior art, i.e. machining a through hole in the valve core 500, so as to balance the pressure from the inlet pipe 900 by interior and exterior end surfaces of the valve core 500. Nevertheless, such expansion valve has instable performance since it realizes the force balance by the valve core 500 applied with forces. In addition, the valve core 500 has complex structure, large weight, large material consumption, and at the same time the load applied to adjusting spring 600 will increase. Furthermore, it is complex and inconvenient to connect, manufacture and assemble the adjusting rod 800 and supporting component 700.

Therefore, the technical problem to be solved by those skilled in the art is to provide an expansion valve which is able to balance the influence of the differential pressure between high pressure and low pressure on the valve core more steadily.

SUMMARY OF THE INVENTION

The technical problem to be solved in the present invention is to provide an expansion valve, which has the function of balancing the influence of the differential pressure between high pressure and low pressure on the valve core more steadily.

In order to solve the above-mentioned technical problem, the present invention provides an expansion valve including a valve body having a chamber; a valve seat and a valve core provided in the chamber; a first opening and a second opening in communication with the chamber, wherein the valve core moves relative to the valve seat to control size of a flow channel between the first opening and the second opening, the valve core includes a valve core head portion facing the valve seat, an axial through hole is provided in the valve core head portion, a piston is provided in the axial through hole, the piston is connected with the valve body.

Preferably, the axial through hole is a constant diameter hole which opens to an end surface of the valve core head portion.

Preferably, the axial through hole includes a small-diameter hole which opens to an end surface of the valve core head portion and a large-diameter hole which is connected with the small-diameter hole to form a step, the piston is provided in the large-diameter hole.

Preferably, a smallest cross-section area of the axial through hole is more than 0.6 times larger than a largest flow area at a valve port of the valve seat.

Preferably, the smallest cross-section area of the axial through hole is more than 0.9 times larger than the largest flow area at the valve port of the valve seat.

Preferably, the valve core head portion is connected with a base portion, the base portion is provided with an interior chamber, and the base portion is provided with a balancing hole which communicates the interior chamber with the second opening.

Preferably, a sealing component is provided between a hole wall of the axial through hole and the piston.

Preferably, the piston is connected to a supporting component of the valve core by a piston connecting rod.

Preferably, a first external thread is provided on an adjusting rod of the expansion valve, a first internal thread which meshes with the first external thread is provided on an inner wall of a adjusting seat of the expansion valve.

Preferably, a bottom recess into which an upper end of an adjusting rod is press mounted is provided on a bottom of the supporting component.

Preferably, a concave hole which fits with a top end of an adjusting rod is provided on a bottom of the supporting component.

Preferably, a top recess into which a lower end of the piston connecting rod is press mounted is provided on a top of the supporting component.

The valve core head portion of the expansion valve according to the present invention has the axial through hole in which piston is arranged, and the piston is connected with the valve body, such that the fluid pressure applied to the valve core is mainly bore by the piston. Since the piston is connected with the valve body, the pressure is eventually transmitted to valve body and is balanced by the valve body. Therefore, the fluid pressure does not influence the working performance of the valve core, and the opening of the valve core may relatively truly reflect the change in the superheat degree of the outlet of the evaporator. Such expansion valve takes use of the valve body itself to balance the forces, such that it is able to balance the influence of the differential pressure between high pressure and low pressure on the valve core more steadily.

DETAILED DESCRIPTION

The spirit of the present invention is to provide an expansion valve which has the function of balancing the influence of the differential pressure between high pressure and low pressure on the valve core more steadily.

Hereinafter, in order to aid those skilled in the art to better understand the technical solution of the present invention, the present invention will be described in detail with reference to the attached drawings and specific embodiments.

Figure 1:
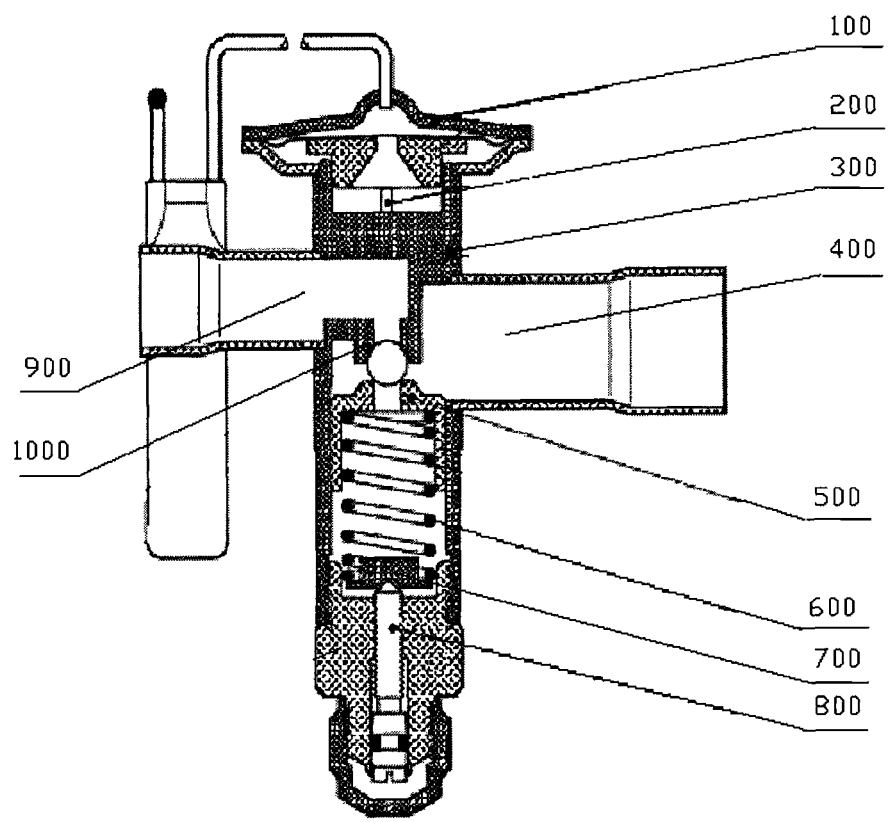
FIG. 1 is a structural schematic view of a typical expansion valve.
Figure 2:
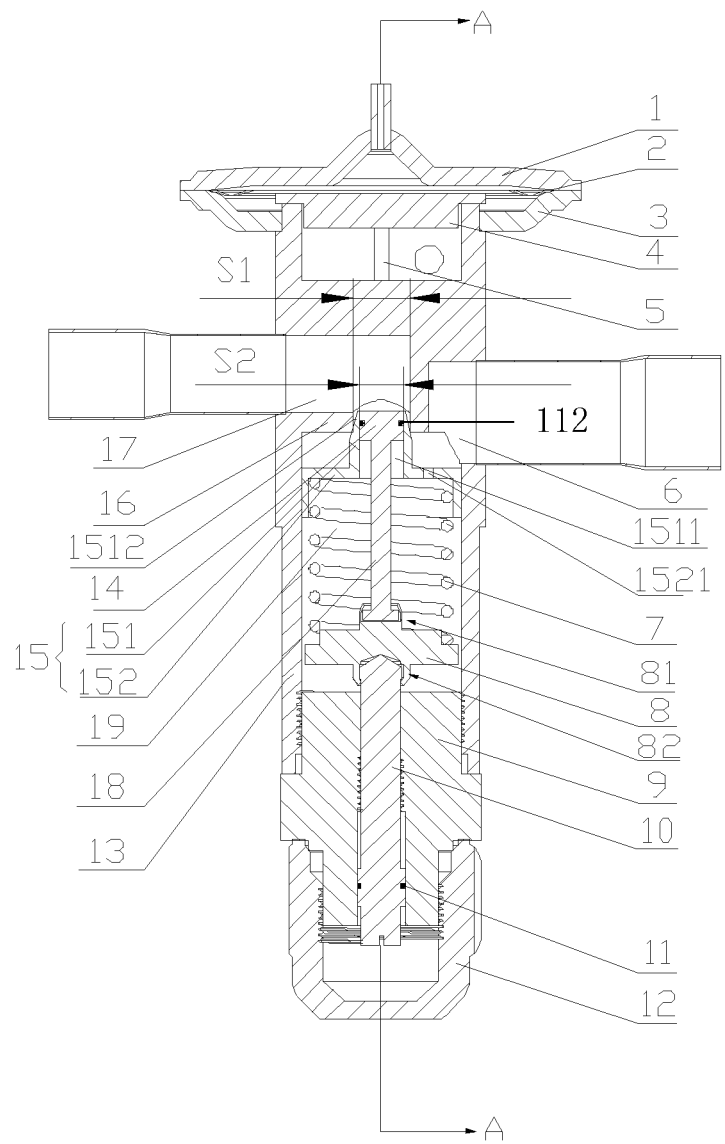
FIG. 2 is a structural schematic view of an embodiment of the expansion valve according to the present invention.
Figure 3:
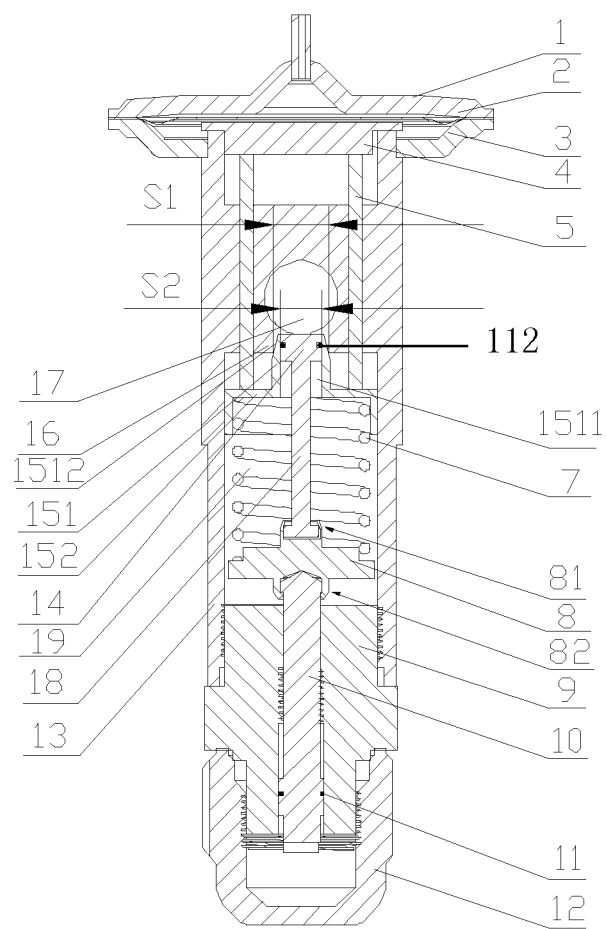
FIG. 3 is a sectional view taken along A-A in FIG. 2.

Please refer to FIGS. 2 and 3. FIG. 2 is a structural schematic view of an embodiment of the expansion valve according to the present invention; FIG. 3 is a sectional view taken along A-A in FIG. 2.

The expansion valve provided in this embodiment includes a valve body 13 having a chamber. The upper end of the valve body 13 is provided with a first opening 17 and a second opening 6. An air tank head component and a driving rod 5 are provided above the first opening 17 and the second opening 6. The air tank head component includes an air tank cover 1, a diaphragm 2, a driving piece 4 and an air tank seat 3. The first opening 17 is connected with the first connecting pipe, the second opening 6 is connected with the second connecting pipe, and both of the first opening 17 and the second opening 6 are in communication with the chamber 19 of the valve body 13.

The expansion valve also includes a valve core 15 and a valve seat 16 which are arranged in the chamber 19, as shown in FIG. 3. The above-mentioned valve seat 16 may be formed by an interior step of the valve body 13, and it's obvious that the valve seat 16 may also be formed separately. The valve core 15 may be moved relative to the valve seat 16 to adjust the opening of the valve port of the valve seat 16, so as to control the size of the flow channel between the first opening 17 and the second opening 6. The valve core includes a valve core head portion 151 facing the valve seat and may also include a base portion 152 connected with the valve core head portion 151. The side wall of the base portion 152 fits with the inner wall of the valve body 13 to form a guide surface for moving the valve core 15. The structure of the valve core may be shown in FIG. 4, the valve core 15 may be moved upwards and downwards relative to the valve seat 16 along an axial direction to adjust the opening of the valve port of the valve seat 16, and therefore controlling the opening of the valve port between the first opening 17 and the second opening 6. The lower end of the driving rod 5 abuts against the upper surface of the base portion 152 of the valve core, and at the same time the valve core 15 is supported by a return structure. As shown in FIG. 3, an adjusting spring 7 may be adopted as the return structure. A temperature sensing bulb (not shown) is arranged at the outlet of the evaporator and senses the temperature at the outlet of the evaporator. When the temperature rises, the pressure of the working medium in the temperature sensing bulb is increased and transferred through capillary tube to the diaphragm 2 which urges the driving piece 4 to move downwards, thus the driving rod 5 is driven to move downwards, which in turn pushes the valve core 15 away from the valve seat 16 against the elasticity of the adjusting spring 7 and the force which is generated by evaporation pressure and acts on the diaphragm and moves the valve core 15 towards a closing direction, such that the opening of the valve port of the valve seat 16 is increased and the flow rate of the refrigerant is increased. When the temperature at the outlet of the evaporator is decreased, the pressure of the working medium in the temperature sensing bulb is decreased and in a process contrary to the above process, the valve core 15 moves towards the valve seat 16 by the evaporation pressure and the return elasticity of the adjusting spring 7, such that the opening of the valve port between the first opening 17 and the second opening 6 is decreased, and the flow rate of the refrigerant is decreased.

Figure 4:
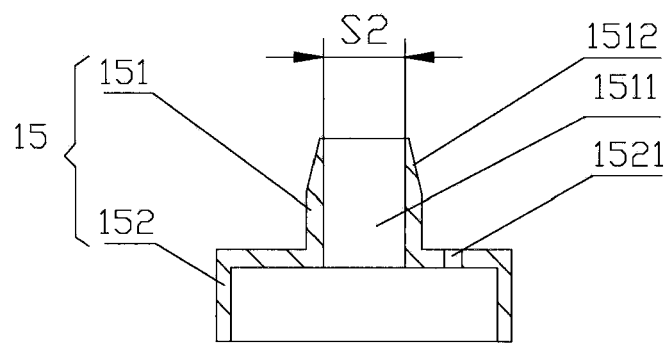
FIG. 4 is an axial sectional view of the valve core of the expansion valve as shown in FIG. 3.
Figure 5:
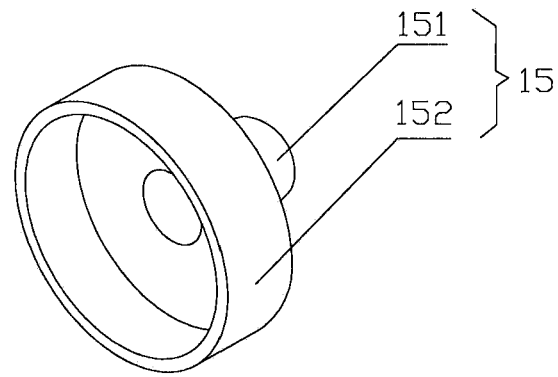
FIG. 5 is a perspective structural schematic view of the valve core as shown in FIG. 4.

Please refer to FIGS. 4 and 5. FIG. 4 is an axial sectional view of the valve core of the expansion valve as shown in FIG. 3; FIG. 5 is a perspective structural schematic view of the valve core as shown in FIG. 4.

The head portion 151 of the valve core 15 which faces the valve seat 16 has an axial through hole 1511. The axial through hole 1511 may be a constant diameter hole which opens to the end surface of the valve core head portion 151 as shown in FIG. 4, and the smallest cross-section area S2 of the axial through hole 1511 is the cross-section area of the hole. The upper end surface of the valve core head portion 151 facing the valve seat 16 is required to bear the fluid pressure in the first opening 17. When the valve core head portion 151 fits with the valve seat 16, the valve core surface 1512 of the valve core head portion 151 fits with the valve seat 16 for sealing. The above-mentioned valve core surface 1512 may be a conical surface of the valve core head portion 151 as shown in FIG. 4. Assuming that the greatest flow area at the valve port is S1, the effective area of the valve core 15 for bearing the pressure in the first opening 17 is the cross-section area of the valve core surface 1512 facing the valve port side, i.e. S1-S2. In the technical solution according to the present invention, when the largest flow area S1 at the valve port is predetermined, the smallest cross-section area S2 of the axial through hole 1511 of the valve core is much larger than the cross-section area of the valve core surface 1512 facing the valve port side, that is, the cross-section area (S1-S2) of the valve core surface 1512 facing the valve port side is made as small as possible. A piston 14 is provided in the axial through hole 1511 of the valve core head portion 151, and the piston 14 is connected with the valve body 13. The piston 14 is used to bear the fluid pressure from the first opening 17, therefore, preferably, the piston 14 hermetically fits with the hole wall of the valve core head portion 151, for example by arranging a sealing ring. At the same time, it is required to ensure that the valve core 15 may move upwards and downwards relative to the piston 14. The force bore by the piston 14 is directly proportional with the cross-section area S2 of the axial through hole 1511 of the valve core 15.

When the refrigerant flows from the first opening 17 to the second opening 6, high-pressure fluid enters the interior chamber of the valve body 13 through the first connecting pipe and exits from the second connecting pipe after being throttled and reduced in pressure by the valve port of the valve seat 16. Since the valve core head portion 151 has the axial through hole 1511 and the smallest cross-section area S2 of the above-mentioned axial through hole 1511 is much larger than the cross-section area of the valve core surface 1512 facing the valve port side, high-pressure fluid pressure from the first opening 17 applies mainly on the upper surface of the piston 14 which is located in the axial through hole 1511 of the valve core head portion 151. Since the piston 14 is connected with the valve body 13, the force bore by the piston 14 is transmitted to the valve body 13 finally for balancing. Meanwhile, since the cross-section area of the valve core surface 1512 of the valve core head portion 151 facing the valve port side is very small, high-pressure fluid pressure from the first opening 17 only applies relative small downward force to the valve core 15 and therefore imposes little influence on the valve core 15.

Furthermore, the chamber 19 to which the lower end of the base portion 152 of the valve core corresponds is in communication with the second opening 6, such that low pressure from the second opening 6 may apply on both of the upper and lower end surfaces of the base portion 152 of the valve core simultaneously. Since the areas of the upper and lower end surfaces of the base portion 152 of the valve core are substantially identical, such structure may also balance the additional force which is generated from low-pressure side and applied to the valve core 15.

When the refrigerant flows from the second opening 6 towards the first opening 17, high-pressure fluid enters into the valve body 13 through the second connecting pipe, and high-pressure fluid pressure applies on both of the upper and lower end surfaces of the base portion 152 of the valve core respectively, and is balanced automatically. The fluid pressure at low-pressure side applies on the valve core surface 1512 of the valve core 15 and the upper end surface of the piston 14 in the same principle as that for the above-mentioned refrigerant flowing from the first opening 17 towards the second opening 6, thus its description will be omitted.

Figure 6:
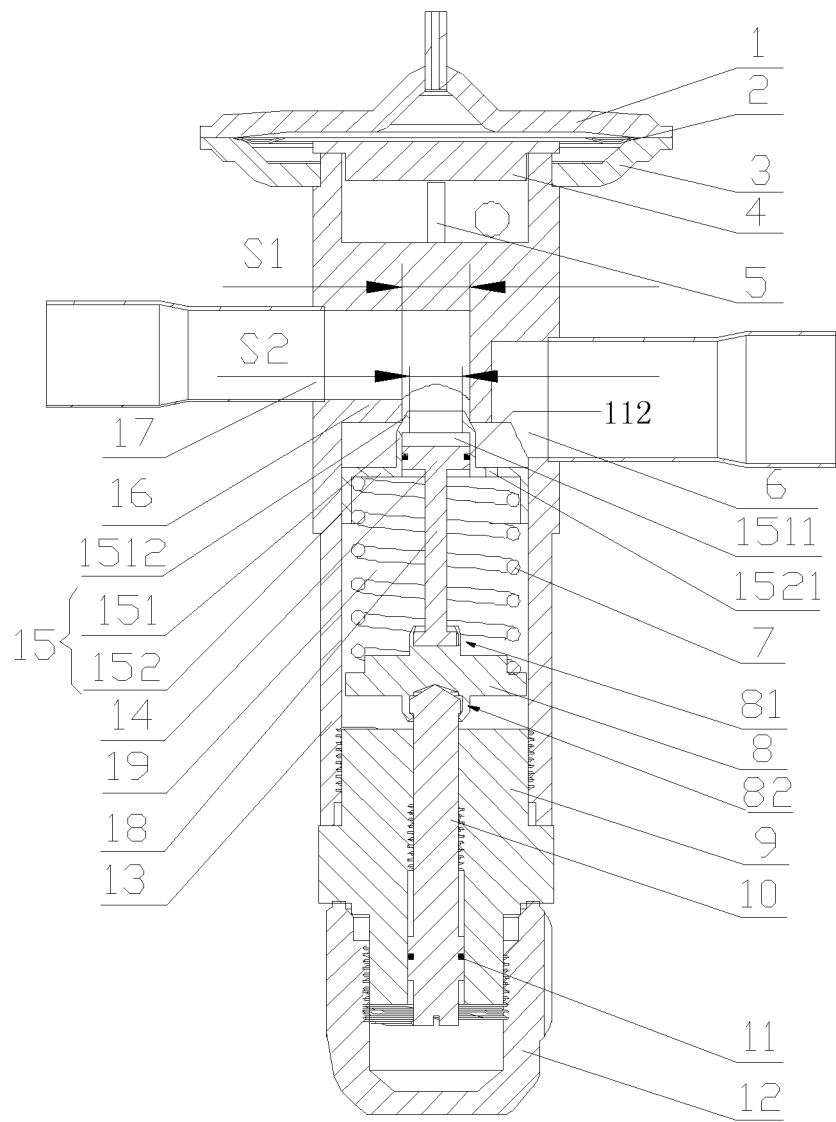
FIG. 6 is a structural schematic view of another embodiment of the expansion valve according to the present invention.
Figure 7:
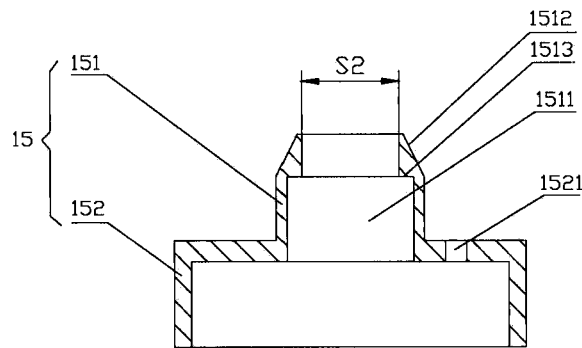
FIG. 7 is an axial sectional view of the valve core as shown in FIG. 6.

Please refer to FIGS. 6 and 7. FIG. 6 is a structural schematic view of another embodiment of the expansion valve according to the present invention; FIG. 7 is an axial sectional view of the valve core as shown in FIG. 6.

In this embodiment, the axial through hole 1511 of the valve core 15 facing the valve seat 16 includes a small-diameter hole which opens to the end surface of the valve core head portion 151 and a large-diameter hole which is connected with the small-diameter hole so as to form a step, the piston 14 is arranged in the large-diameter hole. That is, the inner wall of the top end of the valve core 15 protrude inwards to form a downward annular step 1513, thus forming an axial through hole 1511 which is in the shape of step hole. In the present embodiment, the smallest cross-section area S2 of the axial through hole 1511 is the cross-section area of the small-diameter hole. Like the above-mentioned embodiment, when the largest flow area S1 at the valve port is predetermined, the cross-section area S2 of the small-diameter hole of the valve core axial through hole 1511 is much larger than the cross-section area (i.e. S1-S2) of the valve core surface 1512 facing the valve port side. In this case, the piston 14 can still balance the majority of the pressure at the valve port of the valve seat 16 which comes from the first opening 17. Therefore, such structure may balance the forces which is generated by the pressure of the first opening 17 and applied to the valve core 15.

As for the above embodiments, in order to reduce the force which is applied to the valve core 15 by the fluid at the first opening 17 as much as possible, generally, when the smallest cross-section area S2 of the axial through hole 1511 is more than 0.6 times larger than the largest flow area S1 at the valve port of the valve seat 16 (i.e. S2/S1>0.6), satisfactory effect in reducing the pressure of the valve core 15 may be reached. Preferably, the smallest cross-section area S2 of the axial through hole 1511 is more than 0.9 times larger than the largest flow area S1 at the valve port of the valve seat 16 (i.e. S2/S1>0.9). Of course, it is not intended herein to limit the ratio between the smallest cross-section area S2 of the axial through hole 1511 and the largest flow area S1 at the valve port to be more than 0.6. Instead, all of the embodiments which may reduce the force bearing area of the valve core surface 1512 will fall into the protection scope of the present invention.

In order to better balance the fluid pressure from the second opening 6, an interior chamber may be provided in the base portion 152 of the valve core, and a balancing hole 1521 is provided on the base portion 152 of the valve core to communicate the interior chamber of the base portion 152 of the valve core with the second opening 6. As shown in FIG. 4, the diameter of the base portion 152 of the valve core is larger than the diameter of the valve core head portion 151, and a step surface is formed at the joining position of the base portion 152 of the valve core and the valve core head portion 151. The balancing hole 1521 may be provided on the step surface and penetrate the step surface along its thickness direction, and such balancing hole 1521 communicate the second opening 6 with the interior chamber of the base portion 152 of the valve core. Therefore, high-pressure or low-pressure fluid from the second opening 6 may flow to the upper and lower end surfaces of the base portion 152 of the valve core. Since the areas of the upper and lower end surfaces of the base portion 152 of the valve core are substantially identical, force balance on the valve core 15 is realized.

Alternatively, a clearance may be formed between the outer side wall of the base portion 152 of the valve core and the inner wall of the valve body 13, such that such clearance may communicate the second opening 6 with the interior chamber of the base portion 152 of the valve core. In the same way, high-pressure or low-pressure fluid from the second opening 6 may flow to the upper and lower end surfaces of the base portion 152 of the valve core, so as to realize the force balance on the valve core 15.

Piston 14 may be connected onto the supporting component 8 of the valve core 15 by the piston connecting rod 18. As shown in FIG. 2, the adjusting spring 7 which is connected to the valve core 15 abuts against the supporting component 8, the supporting component 8 is connected with the upper end of the adjusting rod 10, while the adjusting rod 10 is connected with the adjusting seat 9, and the adjusting seat 9 is fixed to the valve body 13. Therefore, connecting the piston 14 to the supporting component 8 by piston connecting rod 18 realize the connection between the piston 14 and valve body 13. Such connecting manner of the piston 14 takes use of the supporting component 8 of the valve core 15, so that the design is simplified and the structure is flexible. Of course, the piston 14 may be connected to the valve body 13 in other manners.

The first external thread may be machined onto the adjusting rod 10 of the expansion valve, and the first internal thread which may mesh with the first external thread may be machined onto the inner wall of the adjusting seat 9 of the expansion valve. These threads may not only fix the position of the adjusting rod 10, but also adjust the axial position of the adjusting rod 10 by rotating the adjusting rod 10 which in turn adjusts the position of the supporting component 8. Finally, the axial length of the adjusting spring 7 is adjusted and the returning capacity of the valve core 15 is controlled in the easier structure and relative high flexibility. It is also possible to further arrange a circular groove on the circumferential wall of the adjusting rod 10. By arranging a sealing ring 11 in the circular groove, the sealing between the adjusting rod 10 and the adjusting seat 9 may be realized.

A spiral groove may be machined onto the bottom of the adjusting rod 10, such that the rotation of the adjusting rod 10 may be realized by simple tools like screwdriver and therefore it is convenient to mount and adjust the adjusting rod 10.

Usually, the adjusting seat 9 is plugged to the lower portion port of the valve body 13. In order to further reinforce the fixation between the adjusting seat 9 and the valve body 13 as well as facilitate mounting, the second external thread may be machined onto the outer wall of the adjusting seat 9 and the second internal thread which may mesh with the second external thread may be machined onto the inner wall of the valve body 13, such that the adjusting seat 9 may be connected and fixed to the lower end of the valve body 13 through thread fit conveniently.

Figure 8:
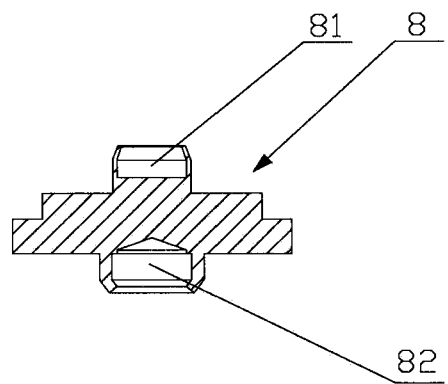
FIG. 8 is an axial sectional view of the supporting component in the expansion valve as shown in FIG. 2.
Figure 9:
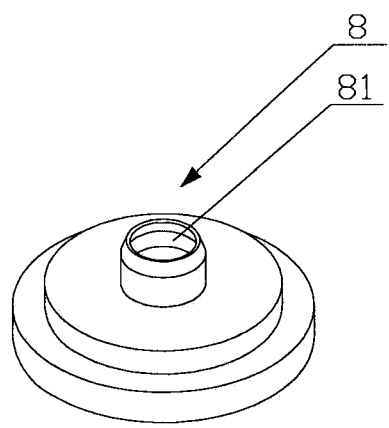
FIG. 9 is a perspective structural schematic view of the supporting component as shown in FIG. 8.

Please refer to FIGS. 8 and 9. FIG. 8 is an axial sectional view of the supporting component in the expansion valve as shown in FIG. 2; FIG. 9 is a perspective structural schematic view of the supporting component as shown in FIG. 8.

A bottom recess 82 is provided on the bottom of the supporting component 8 of the expansion valve. As shown in FIG. 8, the bottom portion of the bottom recess 82 is recessed inwardly to form a cone shape, so as to adapt to the shape of the top end of the adjusting rod 10. Inward bend structure is provided at the lower end surface of the bottom recess 82, and the cross-section area of the parts of the bottom recess 82 other than the lower end surface is substantially identical with that of the upper end of the adjusting rod 10. In the case that it is ensured that the lower end of the adjusting rod 10 is able to freely rotate in the bottom recess 82, the radial clearance between the adjusting rod 10 and the inner wall of the bottom recess 82 should be made as small as possible, preferably less than 0.15 mm, such that the position of the adjusting rod 10 is limited, while rotation or other adjusting movements of the adjusting rod 10 may also be performed. When being mounted, after the sealing ring 11 has been mounted on the adjusting rod 10, the adjusting rod 10 is mounted into the threaded hole of the adjusting seat 9 first. Due to the inward bend structure existed in the bottom recess 82, the upper end of the adjusting rod 10 may be press mounted into the bottom recess 82 of the supporting component 8, so as to limit the adjusting rod 10 and the supporting component 8.

Similar to the above-mentioned fixing manner between the adjusting rod 10 and supporting component 8, a top recess 81 may be machined on the top of the supporting component 8. As shown in FIG. 8, the bottom portion of the top recess 81 is recessed inwardly, and an inward bend structure is provided on the upper end surface of the top recess 81. The cross-section area of the parts of the top recess 81 other than the upper end surface is substantially identical with that of the lower end of the piston connecting rod 18. In the case that it is ensured that the lower end of the piston connecting rod 18 is able to freely rotate in the top recess 81, the radial clearance between the lower end of the piston connecting rod 18 and the inner wall of the top recess 81 should be made as small as possible, and the radial clearance may be controlled as less than 0.15 mm. When being mounted, due to the inward bend structure existed on the upper end surface of the top recess 8, the lower end of the piston connecting rod 18 may be press mounted into the top recess 81 of the supporting component 8.

Furthermore, the sum of the axial clearance between the supporting component 8 and the lower end of the piston connecting rod 18 and the axial clearance between the supporting component 8 and the adjusting rod 10 should be made as small as possible, preferably be controlled as less than 0.5 mm. When the supporting component 8 and the lower end of the piston connecting road 18 are connected by press or the supporting component 8 and the adjusting rod 10 are connected by press, the axial tensile strength of the piston connecting rod 18, the supporting component 8 and the adjusting rod 10 should be able to bear the pressure acting on the piston connecting rod 18 from the second opening 6.

Figure 10:
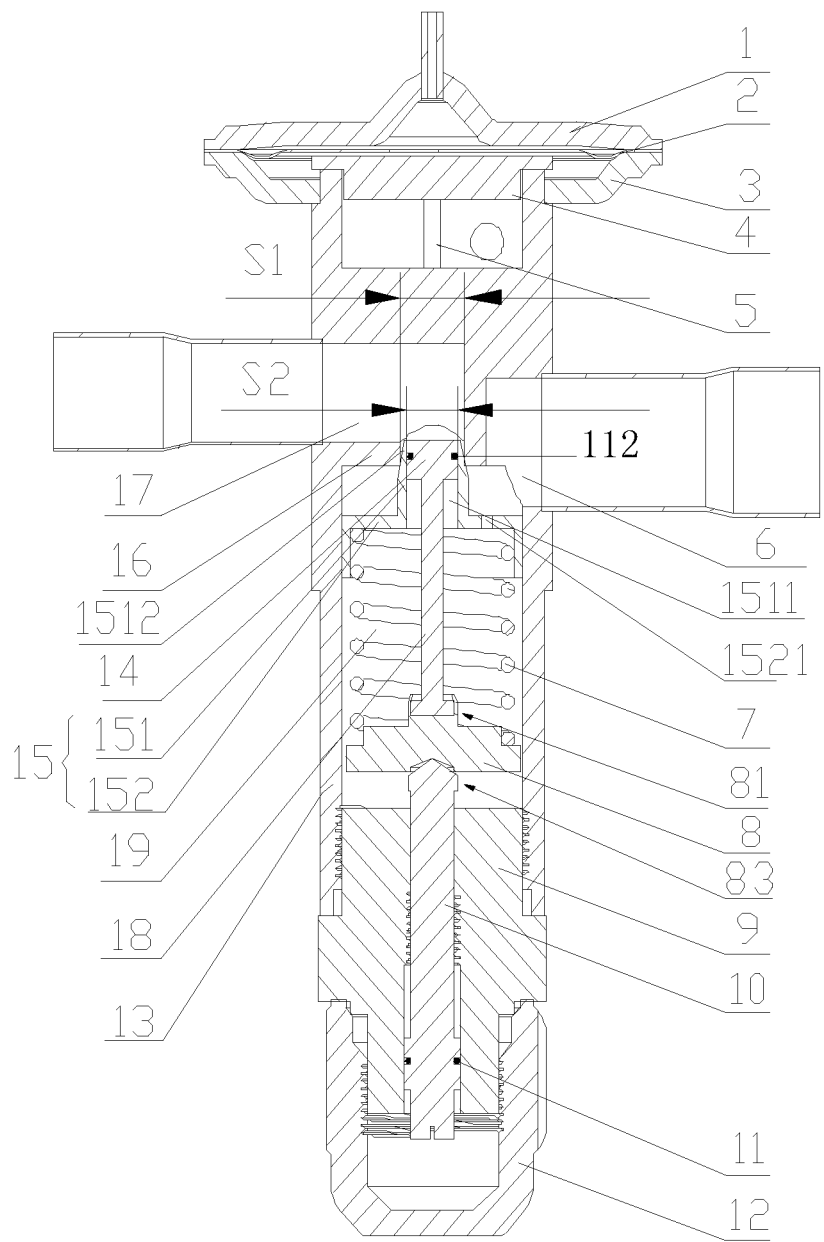
FIG. 10 is a structural schematic view of still another embodiment of the expansion valve according to the present invention.

Please refer to FIG. 10. FIG. 10 is a structural schematic view of still another embodiment of the expansion valve according to the present invention.

A concave hole 83 which fit with the top end of the adjusting rod 10 may be machined on the bottom portion of the supporting component 8, such that when being mounted, the top end of the adjusting rod 10 may be mounted into the concave hole 83 directly, and the adjusting rod 10 may abut against the bottom portion of the supporting component 8. Such structure is suitable for the unidirectional flowing situation from the first opening 17 to the second opening 6, and the supporting component 8 bears the downward pressure. Therefore, the top end of the adjusting rod 10 will be not disengaged from the concave hole 83 on the bottom portion of the supporting component 8, and such structure simplifies the structure of the bottom portion of the supporting component 8 and mounting process.

An expansion valve according to the present invention is described in detail above. The principle of the embodiments of the present invention are described with reference to the specific embodiments, and the description of the above embodiments are used to aid understanding of the method and the spirit of the present invention. It is noted that several modifications and variations may be made by those skilled in the art, without departing form the principle of the present invention, which fall in the protection scope of the claims of the present invention.

What is claimed is:

1. An expansion valve, comprising:
    a valve body having a chamber;
    a valve seat and a valve core provided in the chamber;
    a first opening and a second opening in communication with the chamber,
    wherein the valve core moves relative to the valve seat to control size of a flow channel between the first opening and the second opening,
    wherein the valve core comprises a valve core head portion facing the valve seat, the valve core head portion comprises a valve core surface for cooperating with the valve seat to open or close a valve port of the valve seat, an axial through hole is provided in the valve core head portion, a smallest cross-section area of the axial through hole is more than 0.6 times and less than 1 times of a largest flow area at a valve port of the valve seat, and a piston is provided in the axial through hole, and is connected with the valve body.

2. The expansion valve according to claim 1, wherein the axial through hole is a constant diameter hole which opens to an end surface of the valve core head portion.

3. The expansion valve according to claim 1, wherein the axial through hole comprises a small-diameter hole which opens to an end surface of the valve core head portion and a large-diameter hole which is connected with the small-diameter hole to form a step, the piston is provided in the large-diameter hole.

4. The expansions valve according to claim 1, wherein the smallest cross-section area of the axial through hole is more than 0.9 times and less than 1 times of the largest flow area at the valve port of the valve seat.

5. The expansion valve according to claim 1, wherein the valve core head portion is connected with a base portion, the base portion is provided with an interior chamber, and the base portion is provided with a balancing hole which communicates the interior chamber with the second opening.

6. The expansion valve according to claim 1, wherein a sealing component is provided between a hole wall of the axial through hole and the piston.

7. The expansion valve according to claim 1, wherein the piston is connected to a supporting component of the valve core by a piston connecting rod.

8. The expansion valve according to claim 7, wherein a first external thread is provided on an adjusting rod of the expansion valve, a first internal thread which meshes with the first external thread is provided on an inner wall of an adjusting seat of the expansion valve.

9. The expansion valve according to claim 7, wherein a bottom recess into which an upper end of an adjusting rod is press mounted is provided on a bottom of the supporting component.

10. The expansion valve according to claim 7, wherein a concave hole which fits with a top end of an adjusting rod is provided on a bottom of the supporting component.

11. The expansion valve according to claim 7, wherein a top recess into which a lower end of the piston connecting rod is press mounted is provided on a top of the supporting component.

\* \* \* \* \*

UNITED STATES PATENT AND TRADEMARK OFFICE
CERTIFICATE OF CORRECTION

| | | |
|---|---|---|
| PATENT NO. | : 9,109,822 B2 | Page 1 of 1 |
| APPLICATION NO. | : 13/509771 | |
| DATED | : August 18, 2015 | |
| INVENTOR(S) | : Changqing Liu et al. | |

It is certified that error appears in the above-identified patent and that said Letters Patent is hereby corrected as shown below:

Claims

Col. 10, Line 5, Claim 4, change "expansions" to --expansion--.

Signed and Sealed this
Twenty-third Day of February, 2016

Michelle K. Lee
*Director of the United States Patent and Trademark Office*